(No Model.) 2 Sheets—Sheet 2.
J. BARKER.
Hanging and Driving Device for Rub Rolls.
No. 238,329. Patented March 1, 1881.
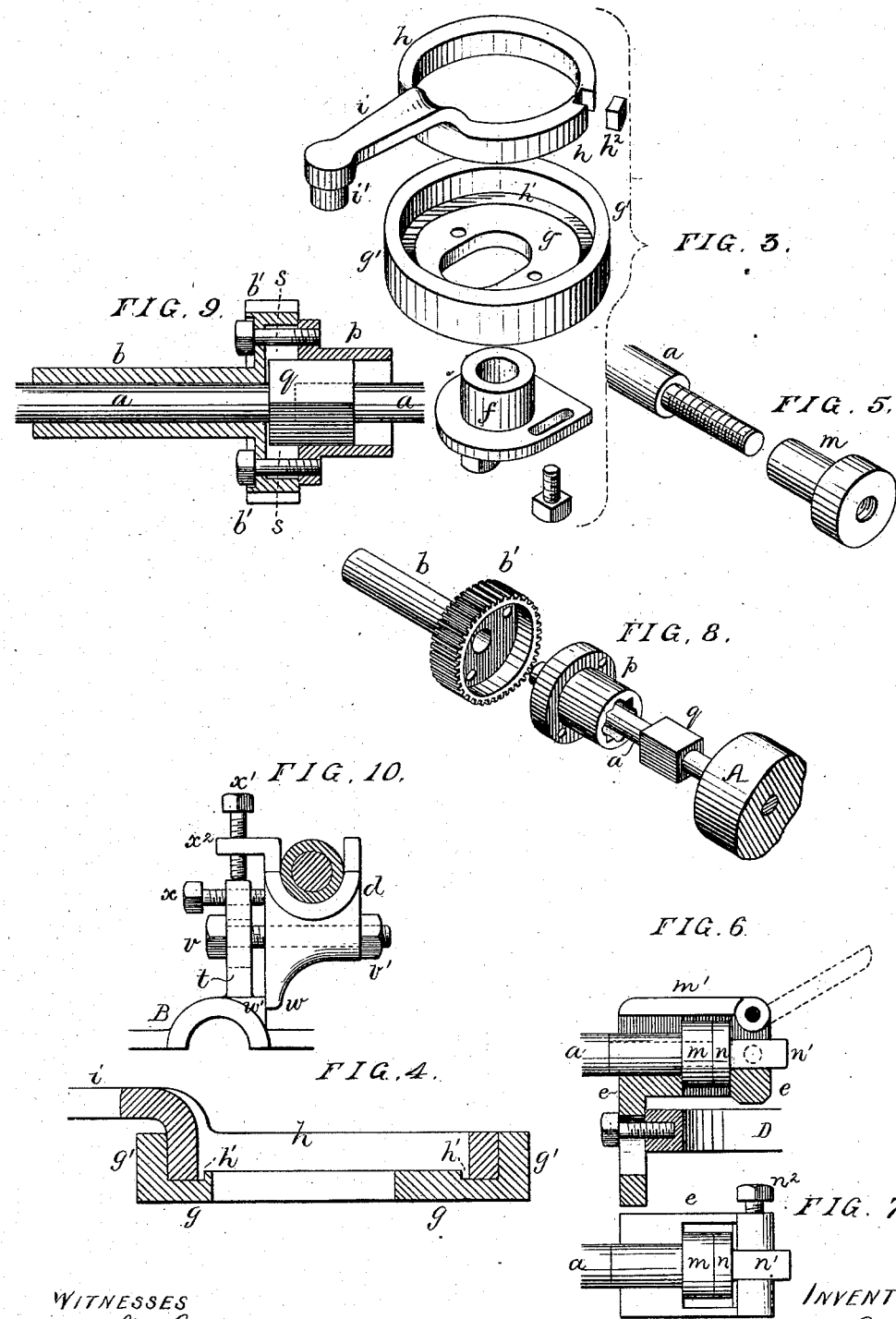

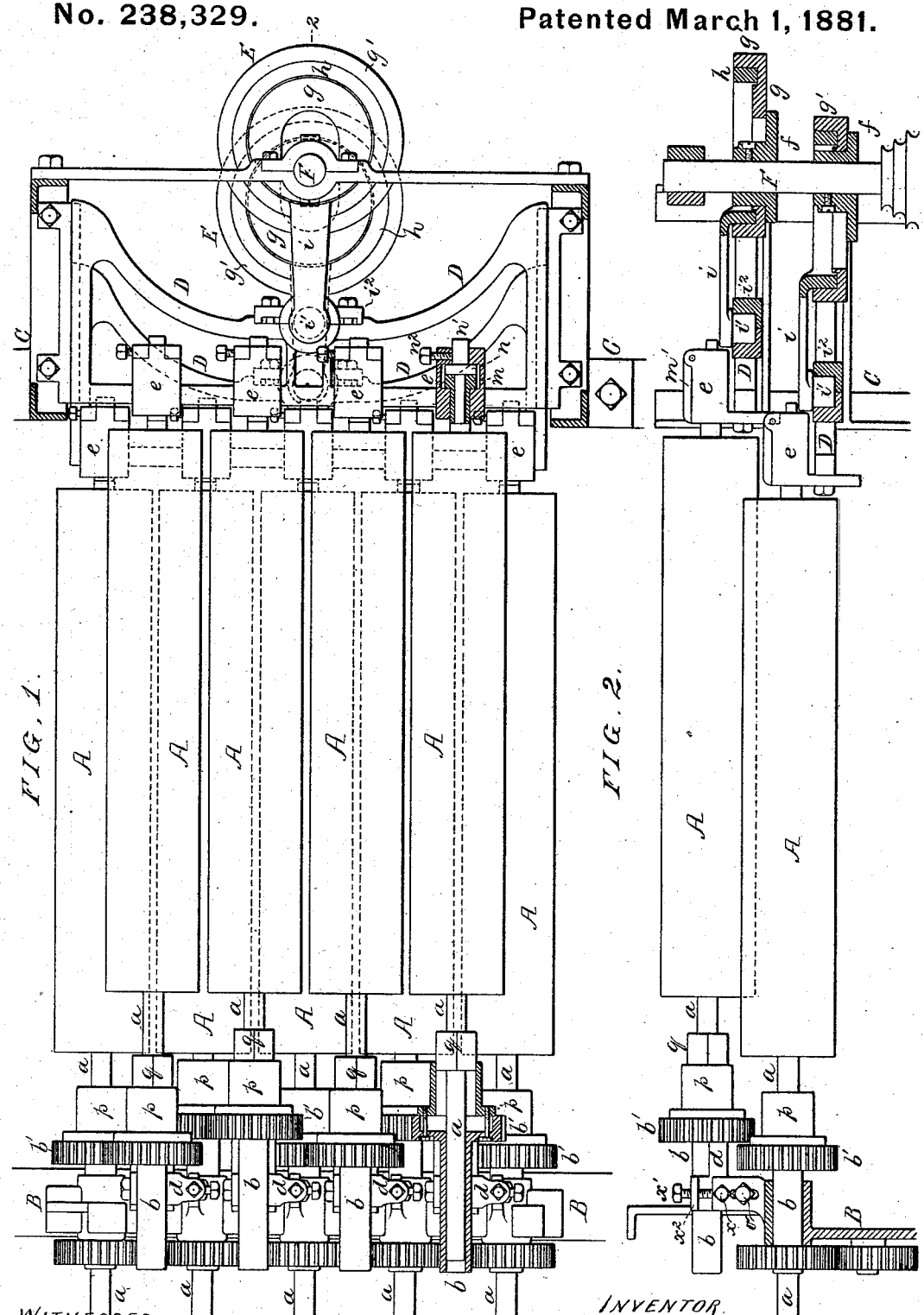

UNITED STATES PATENT OFFICE.

JAMES BARKER, OF CAMDEN, NEW JERSEY.

HANGING AND DRIVING DEVICE FOR RUB-ROLLS.

SPECIFICATION forming part of Letters Patent No. 238,329, dated March 1, 1881.

Application filed June 2, 1880. (No model.)

*To all whom it may concern:*

Be it known that I, JAMES BARKER, a citizen of the United States, residing in Camden, in the county of Camden and State of New Jersey, have invented certain Improvements in Hanging and Driving Devices for Rub-Rolls, of which the following is a specification.

The object of my invention is to construct the bearings and the operating devices of the rub-rolls of carding-machines so that the rolls may be operated very rapidly without risk of rattling or scattering oil, so that the said rolls may be adjusted with nicety and readily secured in position after adjustment, and so that the truth of the rolls and the proper lubrication of the bearings will be insured. This object I attain in the manner which I will now proceed to describe, reference being had to the accompanying drawings, in which—

Figure 1, Sheet 1, is a plan view of one set of rub-rolls, with their bearings and actuating mechanism; Fig. 2, a vertical section on the line 1 2, Fig. 1; and Figs. 3 to 10, Sheet 2, detached views, showing, in detail, different features of my invention.

So far as the general arrangement of the rub-rolls and their driving and supporting devices are concerned, I have made no particular change, my invention relating to improvements in the construction of various parts of the rub-roll system, as hereinafter fully set forth.

In order to prevent confusion, I have shown but one set of rub-rolls with their bearings and actuating mechanism.

A are the rub-rolls, and $a$ the shafts of the same. One end of the shaft $a$ of each rub-roll A of the upper row is adapted to a bearing in a sleeve, $b$, carried by a hanger, $d$, on a frame, B, the latter being secured to or forming part of one of the side frames of the carding-machine, the corresponding ends of the shafts $a$ of the lower row of rolls A being adapted to sleeves which turn in bearings formed directly in said frame B. The opposite ends of the shafts $a$ are fitted to boxes $e$, carried by frames D, of which there is one for each row of rub-rolls, each of said frames D being adapted to guides on the side frame, C, of the carding-machine, and having a reciprocating motion imparted to it by an eccentric, E, on a vertical shaft, F, which has its bearings in a yoke on the said side frame, C, (see Figs. 1 and 2,) and is furnished with a pulley for the reception of a belt from one of the pulleys at the side of the carding-machine, in the usual manner. Each eccentric E comprises a hub, $f$, secured to the shaft F, a disk, $g$, adjustable in respect to said hub, and having a flange, $g'$, and a sleeve, $h$, adapted to the inner side of said flange, and having an arm, $i$, on the end of which is a pin, $i'$, adapted to a bearing on one of the frames D. The arm $i$ projects from the upper edge of the sleeve $h$, instead of from the side of the same, as usual, so as to clear the flange $g'$ of the eccentric-disk $g$, and the lower edge of the sleeve $h$ is adapted to a groove or channel, $h'$, in the disk $g$, this groove serving as an oil-reservoir and insuring the proper lubrication of the bearing between the sleeve and flange $g'$ at all times. (See Figs. 3 and 4.)

By constructing the eccentric-disk with a flange, and adapting the sleeve $h$ to the inner side of this flange, I am enabled to run the eccentric at a much higher rate of speed than usual, as there is not that tendency to scatter the oil, which proves such an objection to an ordinary eccentric when the latter is run at a high speed. The sleeve $h$ is split and recessed for the reception of a parallel key, $h^2$, retaining-lugs being formed on the sleeve to prevent the key from moving inward. The expansion of the sleeve to compensate for wear is effected by removing the key and inserting another of slightly-increased thickness.

The use of the adjustable disk $g$ is not essential, as said disk may be secured directly to the shaft, or may be replaced by a hub having arms connected directly to the flange $g'$, thus forming what may be termed a "flanged eccentric-wheel."

The bearing for the pin $i'$ of the eccentric-arm $i$ is a cup, one half of which is formed in the frame D, and the other half in a detachable cap, $i^2$, the two halves of the cup having their meeting edges properly trued, so that a tight joint will be formed and the oil retained within the cup for the proper lubrication of the pin $i'$.

Each of the boxes $e$ on the frames D has the usual slot for the reception of the rub-roll shaft $a$, and is chambered for the reception of the collar or flange on the end thereof. In the present instance the bearing portion of the shaft and the flange or collar at the end of the same are not formed integral with the shaft, but are comprised in a flanged sleeve, $m$, which is adapted to the reduced and threaded end of the shaft $a$. (See Fig. 5.) Against the end of the sleeve $m$ bears a block, $n$, which has a stem, $n'$, adapted to a slot in the box $e$, the block being retained in any position to which it is adjusted by means of a transverse confining-screw, $n^2$. When the block is adjusted so as to bear firmly against the end of the sleeve $m$, the flange of the latter is confined between said block and the front of the box $e$, so that longitudinal movement of the shaft $a$ independently of the box $e$ is effectually obviated and all rattling prevented. (See Figs. 6 and 7.) When the flange of the sleeve $m$ becomes worn, the block $n$ may be adjusted so as to compensate for such wear, and when the body of the sleeve has been worn away to such an extent as to interfere with the proper bearing of the shaft in the box, said sleeve may be removed from the shaft and a new sleeve substituted therefor. The shaft and its sleeve are at liberty to rise from the box $e$ in the event of the wrapping of sliver around the rub-roll, the hinged lid $m'$ of the box yielding to allow such rising. (See dotted lines, Fig. 7.) By hinging the lid $m'$ to the box, as shown, the loss of said lid on the rising of the rub-roll shaft is prevented, thus overcoming an objection to the loose caps usually employed on the boxes $e$. The end of each rub-roll shaft opposite that which is fitted to the box $e$ is adapted to a sleeve, $b$, the latter being cast on or otherwise secured to a pinion, $b'$, which forms part of the system of gearing, whereby the rub-rolls are rotated.

To the inner face of each pinion $b'$ is secured a flanged tube, $p$, the central opening of which is adapted for the reception of a square or other angular block, $q$, formed on or secured to the shaft $a$, the block fitting snugly, but so as to slide freely in the tube, which, as it rotates with the pinion $b'$, insures the proper rotation of the rub-roll without interfering with its reciprocating movement. (See Fig. 8.) The object of extending the shaft $a$ beyond the block $q$ and adapting it to a long bearing in the sleeve $b$ is to prevent the excessive wear upon the block which would result if that were the only bearing for the shaft, and at the same time to provide an extended bearing for the shaft, and thus prevent the sagging of the rub-roll at the end. Each pinion $b'$ is recessed on the side to which the flanged tube is secured, said pinion and tube thereby inclosing a chamber, $s$, Fig. 9, which serves to contain oil and to distribute the same to the bearing of the block $q$ in the tube $p$, and to the bearing of the shaft $a$ in the sleeve $b$. The sleeves $b$ of those pinions which carry the shafts of the lower row of rub-rolls are adapted to fixed bearings in the frame B; but the sleeves of the pinions of the upper row of rub-rolls rest in hangers $d$, each of which is secured to a projection, $t$, on the frame B by means of a bolt, $v$, and nut $v'$, the stem of the bolt passing through the hanger and through a vertical slot in the projection $t$. A downwardly-projecting finger, $w$, on the hanger bears against a shoulder, $w'$, on the frame B, set-screws $x$ $x'$ serving to effect the adjustment of the hanger and the bearing of the rub-roll shaft carried thereby. The screw $x$ passes through the projection $t$ and bears against the upper end of the hanger, and the screw $x'$ passes through a horizontal flange, $x^2$, on the hanger and bears on the top of the projection $t$. (See Fig. 10.) The bearing of the finger $w$ against the shoulder $w'$ serves to maintain the lower portion of the hanger in a certain longitudinal position; but on loosening the nut $v'$ of the bolt $v$ and manipulating the set-screw $x$, the upper end of the hanger and the sleeve $b$, carrying the rub-roll shaft, may be shifted in one direction or the other to the slight extent which the proper adjustment of the rub-rolls may demand. Vertical adjustment of the hanger is effected by manipulating the set-screw $x'$, the hanger being secured in position after either adjustment by tightening the nut $v'$ of the bolt $v$. These devices thus afford a ready means of effecting the most delicate adjustment of the rub-rolls and of firmly securing the bearings in their proper positions after such adjustment.

I claim as my invention—

1. The combination of a shaft having a flanged eccentric wheel or disk with a sleeve adapted to and acted on by the inner face of said flange, and having an arm projecting over the edge of the same, and with means for rotating said shaft, as set forth.

2. The combination of a shaft, F, and means for rotating the same, an eccentric wheel or disk, $g$, with flange $g'$ and groove or channel $h'$, and a sleeve, $h$, adapted to the inner face of the flange $g'$, and having an arm, $i$, as set forth.

3. The combination of a shaft, F, and means for rotating the same, a flanged eccentric wheel or disk on said shaft, a split sleeve adapted to the inner face of the eccentric-flange, and a parallel key, $h^2$, fitted between the split ends of the sleeve, as set forth.

4. The combination of a shaft, F, and means for rotating the same, a flanged eccentric wheel or disk on said shaft, a split sleeve adapted to the inner face of the eccentric-flange, and a parallel key fitted between the split ends of the sleeve, and retained in position radially in one direction by the eccentric-flange, and in the other direction by lugs on the sleeve, as set forth.

5. The combination of a frame, D, devices for reciprocating the same, a rub-roll shaft, $a$, having a flanged end, a box, $e$, carried by said frame and adapted for the reception of said flanged end of the rub-roll shaft, and an adjustable block, $n$, adapted to the box, and bearing against the flanged end of the rub-roll shaft as described.

6. The combination of the frame D, devices for reciprocating the same, the rub-roll shaft $a$, with flanged end, the box $e$, secured to frame D, the block $n$, with shank $n'$, and the transverse retaining-screw $n^2$, as set forth.

7. The combination of the frame D and devices for reciprocating the same, the rub-roll shaft with flanged end, the bearing-block $n$, and the box $e$, having a hinged cover, $m'$, as specified.

8. The combination of the rub-roll shaft, having an angular block, $q$, beyond which the shaft projects, and the pinion $b'$, having a sleeve, $b$, forming a bearing for the projecting end of the shaft, and a tube, $p$, forming a bearing for the block $q$, with means for reciprocating the rub-roll and rotating the pinion, as specified.

9. The combination of the recessed pinion $b'$ and the tube $p$, secured to the recessed face of the pinion, thereby forming an oil-chamber, $s$, as set forth.

10. The combination, in a bearing for rub-roll shafts, of the frame B, having a slotted projection, $t$, and shoulder $w'$, the hanger $d$, having a finger, $w$, and flange $x^2$, and the bolts $v$, $x$, and $x'$, all constructed and arranged substantially as set forth.

In testimony whereof I have signed my name to this specification in the presence of two subscribing witnesses.

JAMES BARKER.

Witnesses:
  JAMES F. TOBIN,
  HARRY SMITH.